(12) United States Patent
Chang et al.

(10) Patent No.: US 7,566,066 B2
(45) Date of Patent: Jul. 28, 2009

(54) BICYCLE REAR SUSPENSION SYSTEM

(75) Inventors: Owen Chang, Taichung Hsien (TW); Leo Wu, Taichung Hsien (TW)

(73) Assignee: Giant Manufacturing Co., Ltd. (TW)

( * ) Notice: Subject to any disclaimer, the term of this patent is extended or adjusted under 35 U.S.C. 154(b) by 317 days.

(21) Appl. No.: 10/878,542

(22) Filed: Jun. 29, 2004

(65) Prior Publication Data

US 2005/0285367 A1 Dec. 29, 2005

(51) Int. Cl.
*B62K 25/04* (2006.01)

(52) U.S. Cl. .................................. 280/284; 280/283

(58) Field of Classification Search ......... 280/283–286, 280/288, 275, 296; 180/227
See application file for complete search history.

(56) References Cited

U.S. PATENT DOCUMENTS

| | | | | |
|---|---|---|---|---|
| 5,306,036 A * | 4/1994 | Busby | | 280/284 |
| 5,335,929 A * | 8/1994 | Takagaki et al. | | 280/283 |
| 5,791,674 A * | 8/1998 | D'Aluisio et al. | | 280/284 |
| 5,899,480 A * | 5/1999 | Leitner | | 280/284 |
| 6,039,137 A * | 3/2000 | Schless | | 280/284 |
| 6,161,858 A * | 12/2000 | Tseng | | 280/284 |
| 6,203,042 B1 * | 3/2001 | Wilcox | | 280/284 |
| 6,206,397 B1 | 3/2001 | Klassen et al. | | |
| 6,244,610 B1 * | 6/2001 | Kramer-Massow | | 280/283 |
| 6,386,568 B1 | 5/2002 | Tribotte | | |
| 6,488,301 B2 * | 12/2002 | Klassen et al. | | 280/284 |
| 6,595,538 B2 | 7/2003 | Ellsworth et al. | | |
| 6,843,494 B2 * | 1/2005 | Lam | | 280/284 |
| 7,100,930 B2 * | 9/2006 | Saiki | | 280/284 |
| 7,128,329 B2 | 10/2006 | Weagle | | |
| 2003/0038450 A1 * | 2/2003 | Lam | | 280/284 |
| 2004/0070169 A1 * | 4/2004 | Lesage et al. | | 280/284 |
| 2005/0057018 A1 * | 3/2005 | Saiki | | 280/284 |
| 2005/0067810 A1 * | 3/2005 | Weagle | | 280/284 |

* cited by examiner

*Primary Examiner*—Anne Marie M Boehler
(74) *Attorney, Agent, or Firm*—Finnegan, Henderson, Farabow, Garrett & Dunner, LLP

(57) ABSTRACT

A bicycle rear suspension system has a virtual pivot point that is close to a junction between a chain and a front driving sprocket when a piston rod travels relative to a cylinder body by ¼ to ⅓ of a maximum displacement value, and that moves rearwardly when a rear wheel moves upwardly away from the ground. A line interconnecting an instant center of a rear triangular frame and a contacting point between a rear wheel and the ground forms an angle of about 45° with respect to a horizontal line.

23 Claims, 4 Drawing Sheets

BICYCLE REAR SUSPENSION SYSTEM

BACKGROUND OF THE INVENTION

1. Field of the Invention

This invention relates to a bicycle, and more particularly to a bicycle rear suspension system.

2. Description of the Related Art

U.S. Pat. No. 6,595,538 discloses a bicycle rear suspension system. Although the bicycle rear suspension system can effectively absorb shock applied to a rear wheel, it has a relatively complicated structure.

SUMMARY OF THE INVENTION

The object of this invention is to provide a bicycle rear suspension system that has a simple structure.

According to this invention, a bicycle rear suspension system includes a rear triangular frame disposed behind a front triangular frame and supporting a rear wheel thereon, a pair of upper and lower links each interconnecting the front and rear triangular frames at two ends thereof, and a damping hydraulic cylinder having a front end connected pivotally to the front triangular frame, and a rear end connected pivotally to an intermediate portion of the upper link. The damping hydraulic cylinder includes a cylinder body and a piston rod.

The bicycle rear suspension system has a virtual pivot point that is close to a junction between a chain and a front driving sprocket when the piston rod travels relative to the cylinder body by ¼ to ⅓ of a maximum displacement value, and that moves rearwardly when a rear wheel moves upwardly away from the ground. A line interconnecting an instant center of a rear triangular frame and a contacting point between a rear wheel and the ground forms an angle of about 45° with respect to a horizontal line.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
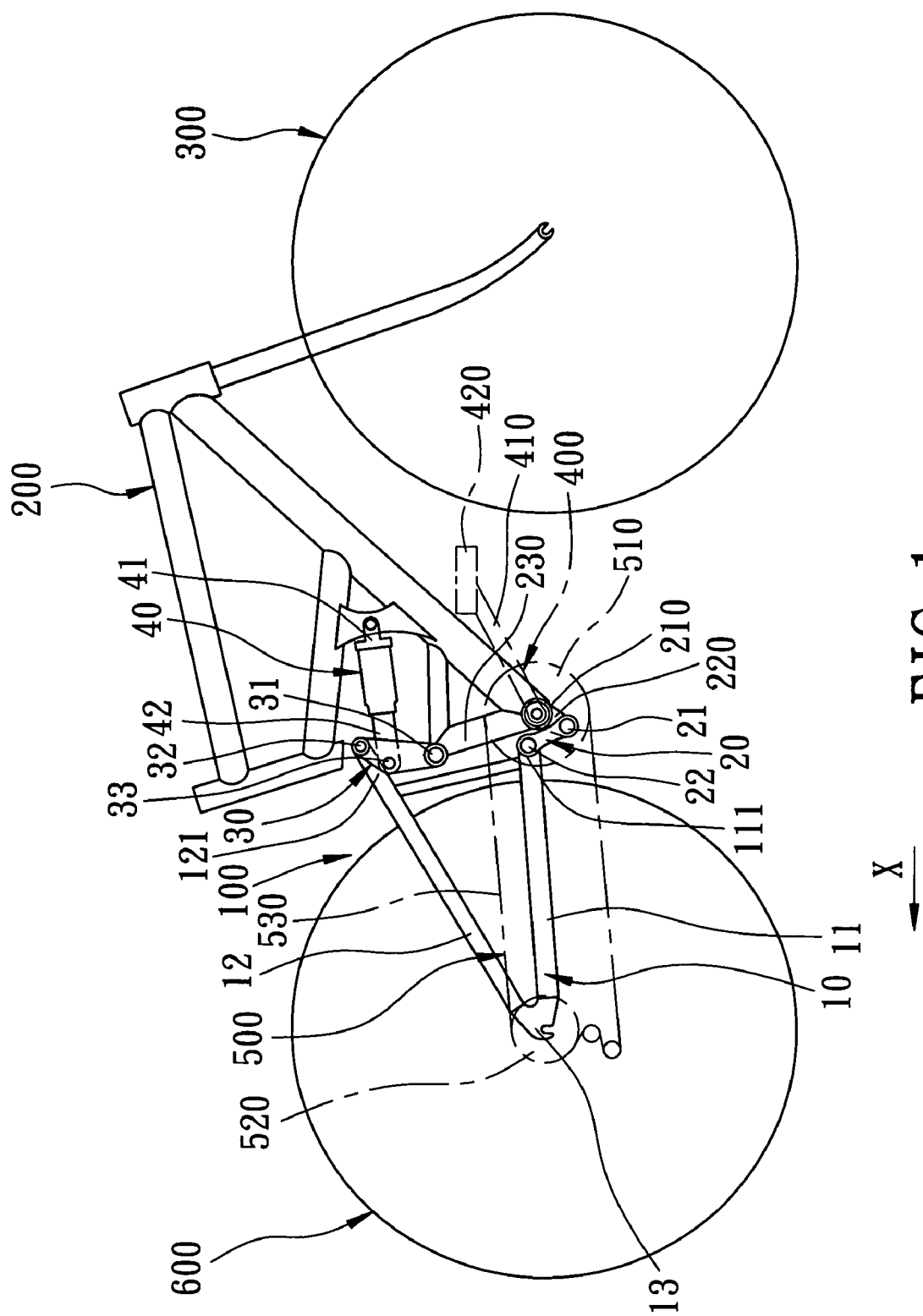
FIG. 1 is a schematic view of the preferred embodiment of a bicycle rear suspension system according to this invention.

Referring to FIG. 1, the preferred embodiment of a bicycle rear suspension system 100 is disposed on a bicycle that includes a front triangular frame 200, a front wheel 300 disposed on a front end of the front triangular frame 200, a crank unit 400 disposed on a bottom portion of the front triangular frame 200, a drive unit 500 driven by the crank unit 400, and a rear wheel 600 disposed behind the front triangular frame 200 and supported by the suspension system 100. The suspension system 100 is used to absorb shock applied to the rear wheel 600. The front triangular frame 200 includes a crankshaft 210 disposed at a bottom portion thereof for connection with the crank unit 400, a rearwardly and downwardly inclined integral lower connecting rod 220 disposed below the crankshaft 210, and a rearwardly and upwardly inclined integral upper connecting rod 230 disposed above the crankshaft 210. The crank unit 400 includes a crank 410 and two pedals 420 connected respectively to two ends of the crank 410. The drive unit 500 includes a front driving sprocket 510 connected to the crank unit 400 in a known manner, a rear driven sprocket 520 connected to the rear wheel 600 in a known manner, and a chain 530 trained on the front driving sprocket 510 and the rear driven sprocket 520.

The suspension system 100 includes a rear triangular frame 10 disposed behind the front triangular frame 200 and having a rear end for supporting the rear wheel 600 thereon; a lower link 20 interconnecting the front and rear triangular frames 200, 10 pivotally; an upper link 30 interconnecting the front and rear triangular frames 200, 10 pivotally and disposed above the lower link 20; and a damping hydraulic cylinder 40 interconnecting the front triangular frame 200 and the upper link 30.

The rear triangular frame 10 has a generally horizontal lower fork portion 11 disposed adjacent to and somewhat higher than the crankshaft 210 at a front end 111 thereof and extending rearwardly in a direction (X), an inclined upper fork portion 12 disposed above and extending integrally, upwardly, and forwardly from a rear end of the lower fork portion 11, and a dropout unit 13 disposed at a juncture between the upper and lower fork portions 12, 11.

The lower link 20 has a first end that is provided with a first pivot pin 21 for connecting the first end of the lower link 20 rotatably to the lower connecting rod 220 of the front triangular frame 200 at a location adjacent to the crankshaft 210, and a second end that is provided with a second pivot pin 22 for connecting the second end of the lower link 20 rotatably to the front end 111 of the lower fork portion 11 of the rear triangular frame 10. The first pivot pin 21 has a rotating axis 21' (see FIG. 3) that is disposed below and behind the rotating axis 210' (see FIG. 3) of the crankshaft 210 of the front triangular frame 200.

The upper link 30 has a first end that is provided with a third pivot pin 31 for connecting the first end of the upper link 30 rotatably to the upper connecting rod 230 of the front triangular frame 200 at a location above the crankshaft 210, a second end that is provided with a fourth pivot pin 32 for connecting the second end of the upper link 30 rotatably to a front end 121 of the upper fork portion 12 of the rear triangular frame 12, and an intermediate portion 33 located between the third and fourth pivot pins 31, 32.

The damping hydraulic cylinder 40 includes a cylinder body 41 connected pivotally to the front triangular frame 200 at a front end thereof, and a piston rod 42 having a front end connected movably to the cylinder body 41, and a rear end connected pivotally to the intermediate portion 33 of the upper link 30. The piston rod 42 is movable relative to the cylinder body 41 by a distance that is equal to or smaller than a maximum displacement value.

Figure 2:
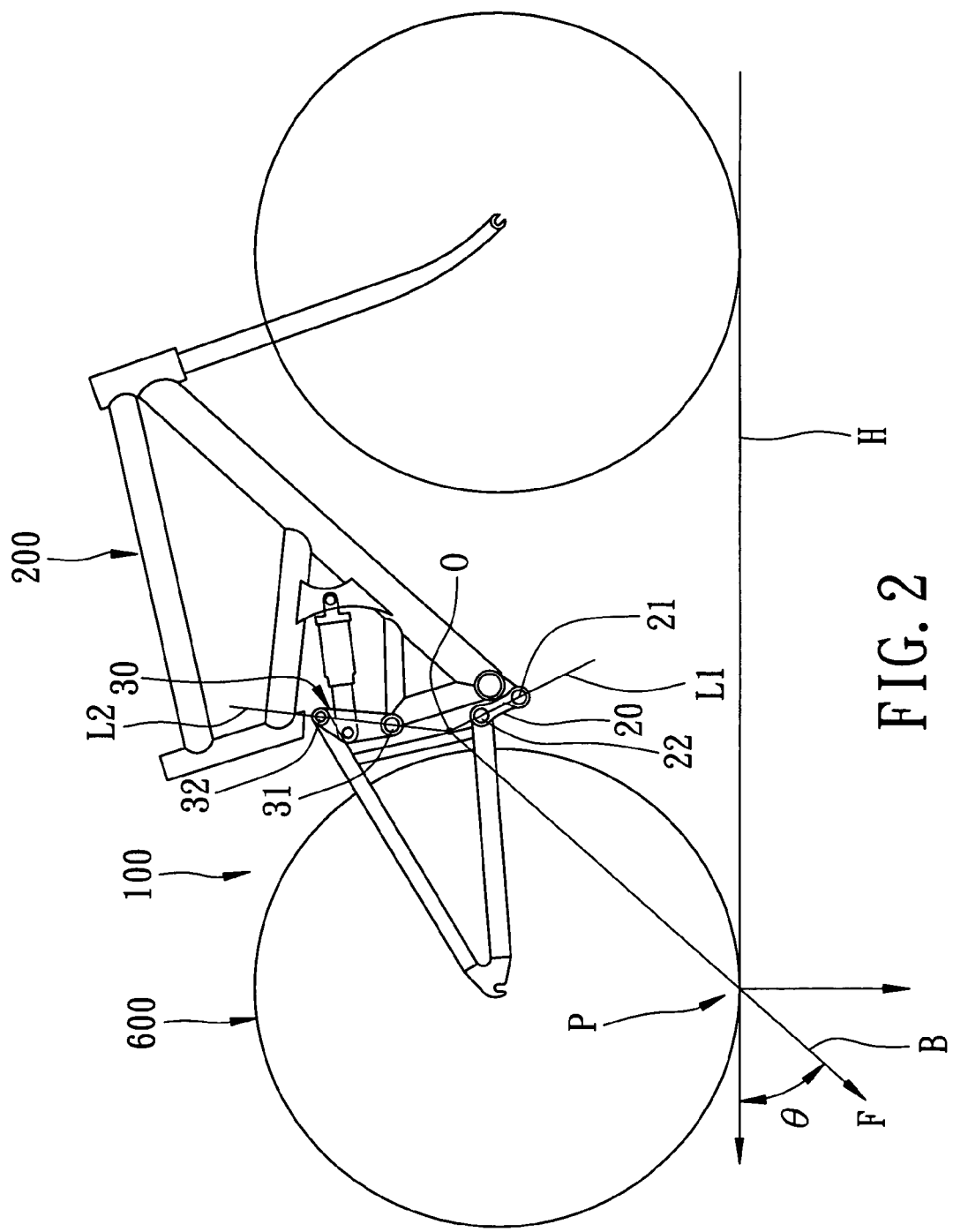
FIG. 2 is a schematic view of the preferred embodiment, illustrating an angle formed between a horizontal line and a line interconnecting an instant center and a contacting point between a rear wheel and the ground.

Referring to FIG. 2, when a rear brake (not shown) is actuated, a braking force (F) that is applied to the rear wheel 600 along a force application line (B) will affect the shock-absorbing characteristics of the suspension system 100. The force application line (B) forms an angle (θ) with respect to a horizontal line (H). The angle (θ) is typically in the range of 40° to 50°. In this embodiment, the angle (θ) is about 45°. The rear triangular frame 10 has an instant center (O) relative to the front triangular frame 200. The instant center (O) is located at an intersecting point of a first line (L1) interconnecting the rotating axes of the first and second pivot pins 21, 22 and a second line (L2) interconnecting the rotating axes of the third and fourth pivot pins 31, 32. Because the force application line (B) interconnects the instant center (O) and a contacting point (P) between the rear wheel 600 and the ground, the effect of the braking force (F) on the shock-absorbing characteristics of the suspension system 100 can be minimized.

Figure 3:
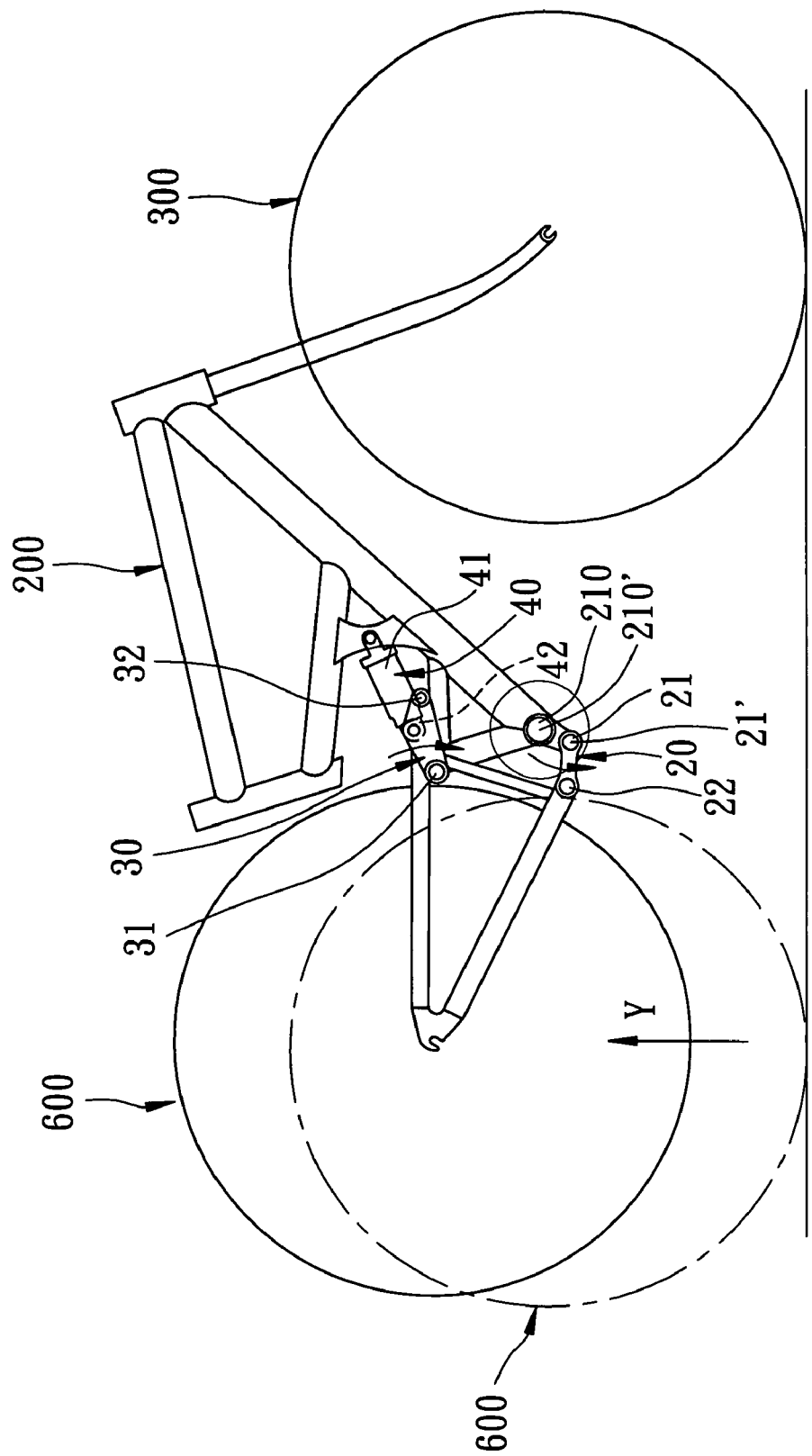
FIG. 3 is a schematic view of the preferred embodiment, illustrating rotation of a pair of upper and lower links in response to upward movement of the rear wheel away from the ground.

Referring to FIGS. 1 and 3, when the rear wheel 600 travels on a bumped road surface (not shown) to thereby move upwardly in a direction (Y) away from the ground, the second pivot pin 22 of the lower link 20 rotates about the first pivot pin 21 of the lower link 20 in a counterclockwise direction away from the front triangular frame 200 and toward the rear wheel 600, while the fourth pivot pin 32 of the upper link 30 rotates about the third pivot pin 31 of the upper link 30 in a clockwise direction away from the rear wheel 600 and toward the front triangular frame 200. At the same time, the piston rod 42 of the damping hydraulic cylinder 40 will retract into the cylinder body 41 of the damping hydraulic cylinder 40 so as to retard relative movement between the front and rear triangular frames 200, 10.

Figure 4:
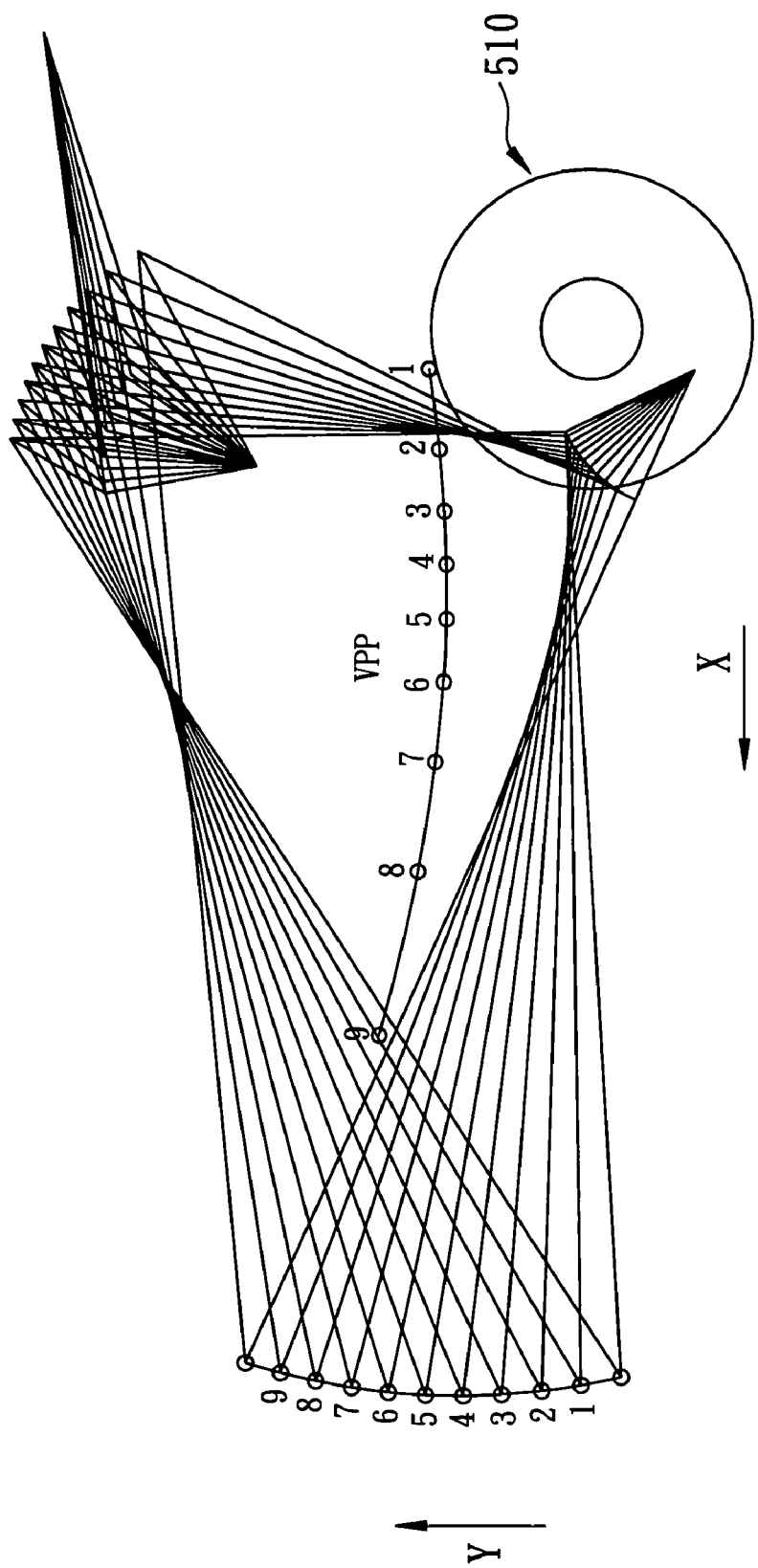
FIG. 4 illustrates how a virtual pivot point is moved rearwardly when the rear wheel moves upwardly away from the ground.

Referring to FIGS. 1 and 4, the suspension system 100 has a virtual pivot point (VPP) that represents the rotating center of the center of the rear wheel 600 when the rear wheel 600 moves relative to the front triangular frame 200. When the rear wheel 600 is disposed at a normal position shown in FIG. 1, the piston 42 travels relative to the cylinder body 41 by ¼ to ⅓ of the maximum displacement value, and the virtual pivot point (VPP) is disposed close to a junction between the chain 530 and the front driving sprocket 510. Thus, a loss in pedaling energy can be reduced. When the rear wheel 600 moves upwardly away from the ground, the virtual pivot point (VPP) moves rearwardly, as shown in FIG. 4, so as to reduce uncomfortable kickback of the pedals 420.

Some of the advantages of this invention can be summarized as follows:
(1) The structure of the suspension system 100 is relatively simple.
(2) When the rear wheel 600 is disposed at its normal position relative to the front triangular frame 200, the virtual pivot point (VPP) is close to the junction between the chain 530 and the front driving sprocket 510. As a consequence, a loss in pedaling energy can be reduced.
(3) When the rear wheel 600 moves upwardly away from the ground, the virtual pivot point (VPP) moves rearwardly so as to reduce uncomfortable kickback of the pedals (420).
(4) Because the line (B) interconnecting the instant center (O) and the contacting point (P) between the rear wheel 600 and the ground forms the angle (θ) of about 45° with respect to the horizontal line (H), the effect of rear wheel braking on the shock-absorbing characteristics of the suspension system 100 is reduced significantly.

With this invention thus explained, it is apparent that numerous modifications and variations can be made without departing from the scope and spirit of this invention. It is therefore intended that this invention be limited only as indicated by the appended claims.

We claim:
1. A bicycle suspension system comprising:
a front frame;
a rear frame adapted to support a rear wheel,
a lower link pivotally connected at a first end thereof to said front frame and pivotally connected at a second end thereof to said rear frame, and an upper link pivotally connected at a first end thereof to said front frame and pivotally connected at a second end thereof to said rear frame;
a drive unit having a chain, a crankshaft mounted directly to the front frame, and a driving sprocket; and
a shock absorber configured to absorb shock applied to the front and rear frames during a compression stroke;
wherein the front and rear frames are arranged to guide a virtual pivot point, which represents a rotating center of a hub axle of the rear wheel when the rear wheel moves upwardly relative to the front frame, to move from a first position, which is located rearward of a center of the driving sprocket and adjacent to a junction between the chain and the driving sprocket when the rear wheel is disposed at a normal position, where a substantially horizontal line extends between a ground contact point of the rear wheel and a ground contact point of the front wheel, to a second position that is rearwardly spaced away from the first position when the rear wheel moves away from the normal position; and
an intersection point of a first line passing through said first and second ends of said lower link, and a second line passing through said first and second ends of said upper link, wherein a line interconnecting said intersection point and the ground contact point of the rear wheel forms an angle of about 40° to 50° with respect to the horizontal line when the rear wheel is disposed at the normal position.

2. The bicycle suspension system of claim 1, wherein said line interconnecting said intersection point and said contacting point forms the angle of about 40° to 50° with respect to said horizontal line surface when a braking force is applied to the rear wheel.

3. The bicycle suspension system of claim 1, wherein the shock absorber includes a cylinder body and a piston rod movable relative to the cylinder body.

4. The bicycle suspension system of claim 1, wherein the front and rear frames are triangular.

5. A bicycle suspension system comprising:
a front frame;
a drive unit having a chain, a crankshaft mounted directly to the front frame, and a driving sprocket;
a rear frame disposed behind the front frame and adapted to support a rear wheel;
a shock absorber configured to absorb shock applied to the front and rear frames during a compression stroke; and
wherein the front and rear frames are configured to guide a virtual pivot point, which represents a rotating center of a hub axle of the rear wheel when the rear wheel moves relative to the front frame, to remain close to a junction between the chain and the driving sprocket when the shock absorber compresses by about ¼ to ⅓ of a maximum compression stroke and to move rearwardly from a first position located rearward of a center of the driving sprocket when the rear wheel moves upwardly away from a ground contact point.

6. The bicycle suspension system of claim 5, when said virtual pivot point moves rearwardly in response to upward movement of the rear wheel away from the ground contacting point, said virtual pivot point descends and subsequently ascends.

7. The bicycle suspension system of claim 5, wherein the shock absorber includes a cylinder body and a piston movable relative to the cylinder body, and when said piston rod moves relative to said cylinder body, said virtual pivot point descents and subsequently ascends.

8. The bicycle suspension system of claim 5, wherein the front and rear frames are structurally configured to guide the virtual pivot point to move from a first position, which is adjacent to the junction between the chain and the driving sprocket when the rear wheel is disposed at a normal position, where a substantially horizontal line extends between the ground contact point of the rear wheel and a ground contact point of the front wheel, to a second position that is rearwardly spaced away from the first position when the rear wheel moves upwardly away from the normal position.

9. A bicycle suspension system comprising:
a front frame;
a rear frame supported by a rear wheel having a center point;
a drive unit having a crankshaft mounted directly to the front frame, a chain and a driving sprocket;
a shock absorber configured to absorb shock applied to the front and rear frames during a compression stroke; and
wherein the front and rear frames are structurally configured to guide a virtual pivot point, which represents a rotational axis of the center point of the rear wheel when the rear wheel moves upward relative to the front frame, to move rearwardly from a first position located rearward of a center of the driving sprocket and remain close to a junction between the chain and the driving sprocket of the drive unit when the shock absorber compresses by a predetermined amount of a maximum compression stroke.

10. The bicycle suspension system of claim 9, further comprising a lower link pivotally connected at a first end thereof to said front frame and pivotally connected at a second end thereof to said rear frame, and an upper link pivotally connected at a first end thereof to said front frame and pivotally connected at a second end thereof to said rear frame, an intersection point of a first line passing through said first and second ends of said lower link, and a second line passing through said first and second ends of said upper link, wherein a line interconnecting the intersection point and a contacting point between the rear wheel and a ground surface forms an angle of about 40° to 50° with respect to the ground surface.

11. The bicycle suspension system of claim 10, wherein the rear frame is structurally configured to maintain the line interconnecting the intersection point and the contacting point between the rear wheel and the ground surface within the angle range of about 40° to 50° with respect to the ground surface when a braking force is applied to the rear wheel.

12. The bicycle suspension system of claim 9, wherein the front and rear frames are connected together at a plurality of pivot points.

13. The bicycle suspension system of claim 9, wherein the front and rear frames are triangular.

14. The bicycle suspension system of claim 9, wherein the predetermined amount is between about one-fourth and one-half of the maximum compression stroke.

15. The bicycle suspension system of claim 9, wherein the predetermined amount is between about one-third to two-thirds of the maximum compression stroke.

16. The bicycle suspension system of claim 9, wherein the front and rear frames are structurally configured to guide the virtual pivot point to move from a first position, which is adjacent to the junction between the chain and the driving sprocket when the rear wheel is disposed at a normal position, where a substantially horizontal line extends between a ground contact point of the rear wheel and a ground contact point of the front wheel, to a second position that is rearwardly spaced away from the first position when the rear wheel moves upwardly away from the normal position.

17. A bicycle suspension system comprising:
a front frame;
a drive unit having a chain, a driving sprocket and a crankshaft mounted directly to the front frame;
a rear frame coupled to the front frame and supported by a rear wheel;
a lower link pivotally connected at a first end thereof to said front frame and pivotally connected at a second end thereof to said rear frame, and an upper link pivotally connected at a first end thereof to said front frame and pivotally connected at a second end thereof to said rear frame;
an intersection point of a first line passing through said first and second ends of said lower link, and a second line passing through said first and second ends of said upper link, wherein a line interconnecting the intersection point and a contacting point between the rear wheel and a ground surface forms an angle of about 40° to 50° with respect to the ground surface;
a shock absorber configured to absorb shock applied to the front and rear frames during a compression stroke; and
wherein the front and rear frames are structurally configured to guide a virtual pivot point, which represents a rotational axis of a center point of the rear wheel when the rear wheel moves upwardly relative to the front frame, to move rearwardly from a first position located rearward of a center of the driving sprocket and remain close to a junction between the chain and the driving sprocket of the drive unit when the shock absorber compresses by a predetermined amount of a maximum compression stroke.

18. The bicycle suspension system of claim 17, wherein the front and rear frames are triangular.

19. The bicycle suspension system of claim 17, wherein the rear frame is structurally configured to maintain the line interconnecting the intersection point and the contacting point between the rear wheel and the ground surface within the angle range of about 40° to 50° with respect to the ground surface when a braking force is applied to the rear wheel.

20. The bicycle suspension system of claim 17, wherein the front and rear frames are connected together at a plurality of pivot points.

21. The bicycle suspension system of claim 17, wherein the predetermined amount is between about one-fourth and one-half of the maximum compression stroke.

22. The bicycle suspension system of claim 17, wherein the predetermined amount is between about one-third to two-thirds of the maximum compression stroke.

23. The bicycle suspension system of claim 17, wherein the front and rear frames are structurally configured to guide the virtual pivot point to move from a first position, which is adjacent to the junction between the chain and the driving sprocket when the rear wheel is disposed at a normal position, where a substantially horizontal line extends between a ground contact point of the rear wheel and a ground contact point of the front wheel, to a second position that is rearwardly spaced away from the first position when the rear wheel moves upwardly away from the normal position, the line interconnecting said intersection point to the contacting point between the rear wheel and a ground surface forms the angle of about 40° to 50° with respect to the ground surface when the rear wheel is disposed at the normal position.

* * * * *

UNITED STATES PATENT AND TRADEMARK OFFICE
CERTIFICATE OF CORRECTION

PATENT NO. : 7,566,066 B2  Page 1 of 1
APPLICATION NO. : 10/878542
DATED : July 28, 2009
INVENTOR(S) : Owen Chang et al.

It is certified that error appears in the above-identified patent and that said Letters Patent is hereby corrected as shown below:

In claim 1, column 3, line 64, "wheel," should read --wheel;--.

In claim 7, column 4, line 66, "descents" should read --descends--.

Signed and Sealed this

Seventeenth Day of November, 2009

David J. Kappos
*Director of the United States Patent and Trademark Office*